(12) United States Patent
Hohwald et al.

(10) Patent No.: US 11,048,744 B1
(45) Date of Patent: Jun. 29, 2021

(54) COMPUTER ARCHITECTURE FOR WEIGHTING SEARCH RESULTS BY STYLISTIC PREFERENCES

(71) Applicant: SHUTTERSTOCK, INC., New York, NY (US)

(72) Inventors: Heath Walter Hohwald, Logrono (ES); Lawrence Lazare, Croton, NY (US); Kevin Lester, Summit, NJ (US)

(73) Assignee: Shutterstock, Inc., New York, NY (US)

(*) Notice: Subject to any disclaimer, the term of this patent is extended or adjusted under 35 U.S.C. 154(b) by 350 days.

(21) Appl. No.: 15/394,319

(22) Filed: Dec. 29, 2016

(51) Int. Cl.
*G06F 16/51* (2019.01)
*G06F 16/43* (2019.01)
*G06F 16/56* (2019.01)
*G06F 16/583* (2019.01)
*G06F 16/55* (2019.01)
*G06F 16/53* (2019.01)
(Continued)

(52) U.S. Cl.
CPC .............. *G06F 16/51* (2019.01); *G06F 16/43* (2019.01); *G06F 16/53* (2019.01); *G06F 16/535* (2019.01); *G06F 16/55* (2019.01); *G06F 16/56* (2019.01); *G06F 16/5838* (2019.01); *G06F 16/9535* (2019.01)

(58) Field of Classification Search
CPC ......... G06F 17/30244; G06F 17/30247; G06F 17/30256; G06F 17/30265; G06F 16/58; G06F 16/583; G06F 17/30271; G06F 17/30277; G06F 17/3028; G06F 16/40; G06F 16/43; G06F 16/432; G06F 16/48; G06F 16/483; G06F 16/487; G06F 16/45; G06F 16/489; G06F 16/50; G06F 16/51; G06F 16/53; G06F 16/532; G06F 16/535; G06F 16/538; G06F 16/54; G06F 16/55; G06F 16/5838; G06F 16/5846; G06F 16/5854; G06F 16/5862; G06F 16/9535; G06F 16/9536; G06F 16/9538
See application file for complete search history.

(56) References Cited

U.S. PATENT DOCUMENTS 6,968,511 B1 *  11/2005  Robertson ............... G06F 3/048
                                                  715/205
8,352,465 B1 *   1/2013  Jing ........................ G06F 16/54
                                                  707/723

(Continued)

*Primary Examiner* — David T. Brooks
(74) *Attorney, Agent, or Firm* — McDermott Will & Emery LLP

(57) ABSTRACT

Methods for identifying data files responsive to a search query and weighted according to a stylistic preference are provided. In one aspect, a method includes receiving a search query for a collection of media files from a device associated with a user associated with a user identifier, and identifying a set of image files from the collection that is responsive to the query. Each image file in the set is associated with a relevancy score. The method also includes retrieving a stylistic preference profile associated with the user identifier to apply to the set, and weighting the score for each image file according to the profile to generate a weighted stylistic preference score for each image file. The method further includes creating a listing of the set that is sorted according to weighted stylistic preference score, and providing the listing to the device. Systems and machine-readable media are also provided.

14 Claims, 12 Drawing Sheets

(51) Int. Cl.
*G06F 16/9535* (2019.01)
*G06F 16/535* (2019.01)

(56) References Cited

U.S. PATENT DOCUMENTS

| | | | | |
|---|---|---|---|---|
| 8,676,803 | B1* | 3/2014 | Leung | G06F 16/5866 |
| | | | | 707/737 |
| 9,230,328 | B1* | 1/2016 | Wotzlaw | G06K 9/6202 |
| 9,483,701 | B1* | 11/2016 | Kwatra | G06K 9/6255 |
| 2005/0141497 | A1* | 6/2005 | Wu | H04L 41/00 |
| | | | | 370/389 |
| 2007/0174790 | A1* | 7/2007 | Jing | G06F 3/0482 |
| | | | | 715/838 |
| 2007/0288432 | A1* | 12/2007 | Weltman | G06F 16/583 |
| 2008/0085055 | A1* | 4/2008 | Cerosaletti | G06F 16/51 |
| | | | | 382/225 |
| 2008/0219559 | A1* | 9/2008 | Koike | G06F 3/0346 |
| | | | | 382/190 |
| 2009/0202157 | A1* | 8/2009 | Zhang | G06K 9/4619 |
| | | | | 382/224 |
| 2009/0290812 | A1* | 11/2009 | Naaman | G06K 9/4671 |
| | | | | 382/305 |
| 2011/0314031 | A1* | 12/2011 | Chittar | G06F 16/5838 |
| | | | | 707/749 |
| 2012/0066626 | A1* | 3/2012 | Geleijnse | G06Q 30/02 |
| | | | | 715/765 |
| 2012/0082378 | A1* | 4/2012 | Peters | G06F 16/58 |
| | | | | 382/165 |
| 2012/0143911 | A1* | 6/2012 | Liebald | G06F 3/0482 |
| | | | | 707/771 |
| 2013/0315477 | A1* | 11/2013 | Murray | G06F 16/58 |
| | | | | 382/159 |
| 2015/0039620 | A1* | 2/2015 | Ning | G06F 16/4387 |
| | | | | 707/740 |
| 2015/0220806 | A1* | 8/2015 | Heller | G06F 16/583 |
| | | | | 382/159 |
| 2016/0188557 | A1* | 6/2016 | Spanu | G06F 3/04842 |
| | | | | 715/230 |
| 2016/0379091 | A1* | 12/2016 | Lin | G06K 9/00724 |
| | | | | 382/156 |
| 2017/0140060 | A1* | 5/2017 | Cody | G06F 16/955 |

* cited by examiner

Images representing your preferred style

411

412

Do you confirm this style selection ?

⦿ Yes ○ No ← 413

Submit

410

COMPUTER ARCHITECTURE FOR WEIGHTING SEARCH RESULTS BY STYLISTIC PREFERENCES

TECHNICAL FIELD

The present disclosure generally relates to a computer architecture for a database of files, and more specifically relates to identifying and weighting files in the database responsive to a search query.

BACKGROUND

Network accessible data file repositories for content commonly hosted on server devices ordinarily provide users of client devices with an ability to access search algorithms for searching and accessing data files for content in the data file repositories. For example, for a network accessible media content repository with a large volume of data files, such as for images and videos, a user that seeks to search for media related to cats may enter the search query "cats" into a search interface for the online image content repository accessible by and displayed on the user's client device. Media associated with the keyword "cat" or "cats" that is determined by the server to be responsive to the search query may then be returned to the client device for display to the user.

Searching for content, such as images, can present challenges to the user because it can often be difficult to express in text what the user is looking for—particularly the user's stylistic preferences. For example, if a user is looking for an image of an elderly couple photographed in a certain style, most image retrieval systems for data file repositories are limited to supporting textual keyword searches. In this case, the user submits a search query for "elderly couple," and then browses through many images from the data file repository provided in response to the search query that do not match the user's stylistic interests until the user identifies at least one or two images that do match those stylistic preferences.

The description provided in the background section should not be assumed to be prior art merely because it is mentioned in or associated with the background section. The background section may include information that describes one or more aspects of the subject technology.

SUMMARY

The disclosed system provides for building a style profile for a user based on images the user has previously indicated a preference for, and using that style profile to improve search results for images responsive to the user's search query. The image search results can then be sorted, categorized, or filtered based on one or many of the user's style profiles.

According to certain aspects of the present disclosure, a computer-implemented method for identifying data files responsive to a search query and weighted according to a stylistic preference is provided. The method includes receiving a search query for a collection of media files from a device associated with a user, the user associated with a user identifier, and identifying a set of image files from the collection of media files that is responsive to the search query, wherein each image file in the set of image files is associated with a relevancy score indicating a relevance of the respective image file to the search query. The method also includes retrieving a stylistic preference profile associated with the user identifier to apply to the set of image files, and weighting the relevancy score for each image file in the set of image files according to the stylistic preference profile associated with the user identifier to generate a weighted stylistic preference score for each image file in the set of image files. The method further includes creating a listing of the set of image files that is sorted according to the weighted stylistic preference score of each respective image file in the set of image files, and providing the listing to the device associated with the user for display.

According to certain aspects of the present disclosure, a system for identifying data files responsive to a search query and weighted according to a stylistic preference is provided. The system includes a memory that includes instructions, and a processor. The processor is configured to execute instructions which, when executed, cause the processor to identify a subset of image files, from a collection of media files, with which a user has previously interacted, and cluster the subset of image files into a number of clusters based on their stylistic similarity. The stylistic similarity of each image file in the subset of image files is determined using an image vector corresponding to each image file. Each image file in the collection of media files has an associated unique index value mapping each image file to a corresponding dense image vector for the image file capturing a visual nature of the image file. Each image file in the subset of image files is associated with a stylistic centroid of one of the clusters. The processor is also caused to assign a user profile cluster weight value for the user to each cluster based on a normalized count of images in the cluster, receive a search query for the collection of media files from a device associated with the user, the user associated with a user identifier, and identify a set of image files from the collection of media files that is responsive to the search query, wherein each image file in the set of image files is associated with a relevance score indicating a relevance of the respective image file to the search query. The processor is also caused to retrieve a stylistic preference profile associated with the user identifier to apply to the set of image files which includes the user profile cluster weight values and information regarding the clusters, and weight the relevancy score for each image file in the set of image files according to the stylistic preference profile associated with the user identifier to generate a weighted stylistic preference score for each image file in the set of image files. The processor is further caused to create a listing of the set of image files that is sorted according to the weighted stylistic preference score of each respective image file in the set of image files, and provide the listing to the device associated with the user for display.

According to certain aspects of the present disclosure, a non-transitory machine-readable storage medium includes machine-readable instructions for causing a processor to execute a method is provided. The method includes receiving a search query for a collection of media files from a device associated with a user, the user associated with a user identifier, and identifying a set of image files from the collection of media files that is responsive to the search query, wherein each image file in the set of image files is associated with a relevancy score indicating a relevance of the respective image file to the search query. The method also includes retrieving a stylistic preference profile associated with the user identifier to apply to the set of image files, and weighting the relevancy score for each image file in the set of image files according to the stylistic preference profile associated with the user identifier to generate a weighted stylistic preference score for each image file in the set of image files. The method further includes creating a listing of the set of image files that is sorted according to the weighted stylistic preference score of each respective image file in the set of image files, and providing the listing to the device associated with the user for display.

According to certain aspects of the present disclosure, a system for identifying data files responsive to a search query and weighted according to a stylistic preference is provided. The system includes means for storing instructions and means for executing the instructions. The means for executing the instructions is configured to identify a subset of image files, from a collection of media files, with which a user has previously interacted, and cluster the subset of image files into a number of clusters based on their stylistic similarity. The stylistic similarity of each image file in the subset of image files is determined using an image vector corresponding to each image file. Each image file in the collection of media files has an associated unique index value mapping each image file to a corresponding dense image vector for the image file capturing a visual nature of the image file. Each image file in the subset of image files is associated with a stylistic centroid of one of the clusters. The means for executing the instructions is also configured to assign a user profile cluster weight value for the user to each cluster based on a normalized count of images in the cluster, receive a search query for the collection of media files from a device associated with the user, the user associated with a user identifier, and identify a set of image files from the collection of media files that is responsive to the search query; wherein, each image file in the set of image files is associated with a relevance score indicating a relevance of the respective image file to the search query. The means for executing the instructions is further configured to retrieve a stylistic preference profile associated with the user identifier to apply to the set of image files, which includes the user profile cluster weight values and information regarding the clusters, and weight the relevancy score for each image file in the set of image files according to the stylistic preference profile associated with the user identifier to generate a weighted stylistic preference score for each image file in the set of image files. The means for executing the instructions is yet further configured to create a listing of the set of image files that is sorted according to the weighted stylistic preference score of each respective image file in the set of image files, and provide the listing to the device associated with the user for display.

According to certain aspects of the present disclosure, a computer-implemented method for identifying data files responsive to a search query and weighted according to a stylistic preference is provided. The method includes providing a search query for a collection of media files from a device associated with a user to a server, the user associated with a user identifier, and receiving, from the server and for display on the device, a listing of a set of image files that is responsive to the search query and that is sorted according to a weighted stylistic preference score of each respective image file in the set of image files generated based on a stylistic preference profile associated with the user identifier. The provided listing of the set of image files is grouped according to a stylistic similarity cluster to which the respective image file belongs.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
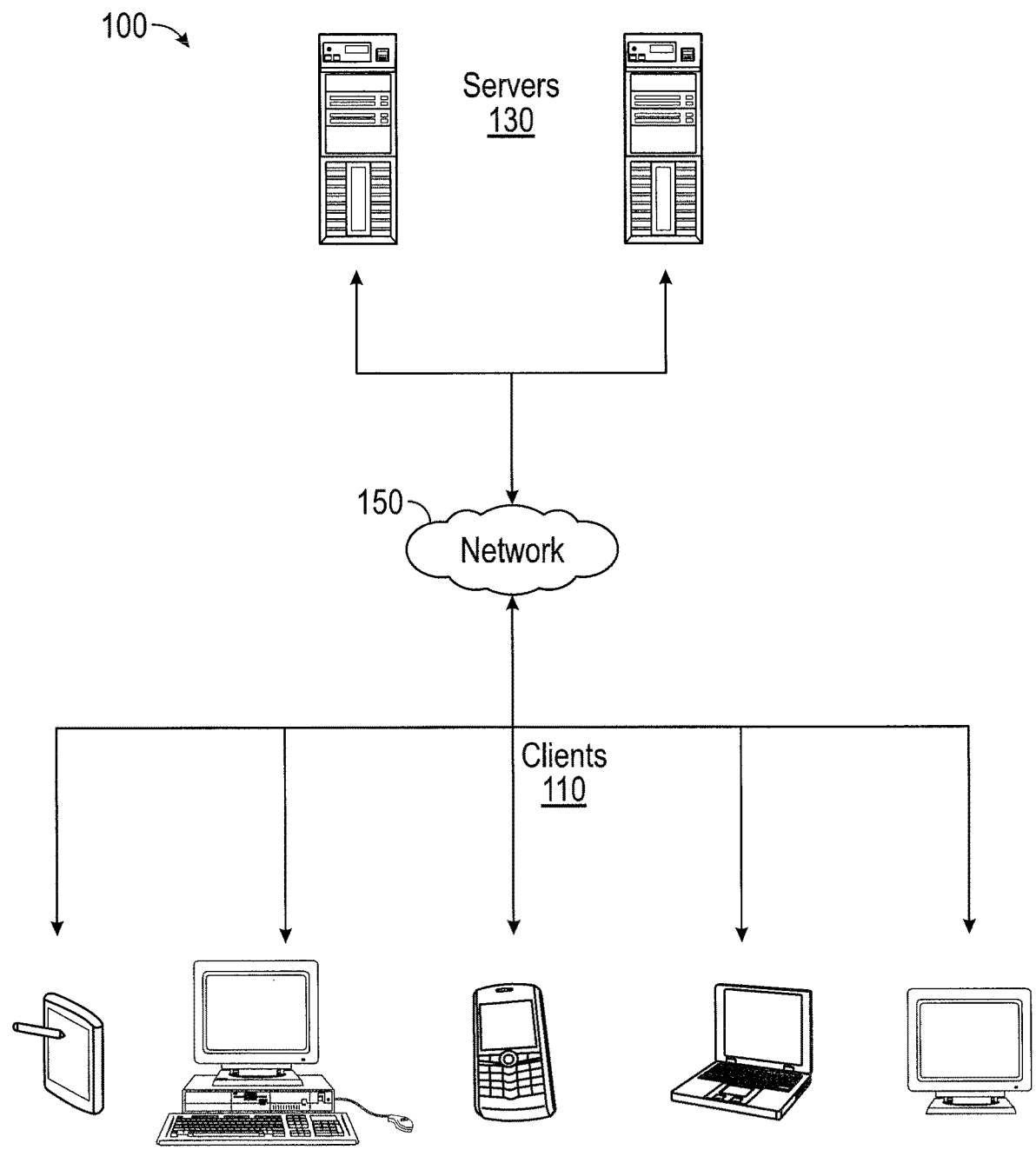
FIG. 1 illustrates an example architecture for identifying data files responsive to a search query and weighted according to a stylistic preference.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for generating one or several profiles of stylistic preferences of a user for image files using, for example, past interaction data for the user with image files or asking the user to provide stylistic preference data (and thereafter saving the stylistic preferences as a stylistic preference profile for the user). Thereafter, when a user submits a search query for image files from a collection of images, the image files that are responsive to the search query and the user's selected stylistic preference profile can be returned. The responsive image files can be, for example, ranked according to their relevance and/or a stylistic preference profile score, grouped by stylistic profile, and/or filtered by stylistic profile.

The disclosed system provides an improvement to computer functionality by allowing computer performance of a function not previously performed by a computer. Specifically, the disclosed system provides for an identification, using user-specific weighted stylistic preference scores, of image files that are responsive both to a user's search query and a stylistic preference profile of the user.

The ability to separately extract both a stylistic representation and a content representation from an image file can be used to help power an image search engine informed by stylistic preferences as disclosed herein. In this regard, the disclosed system can take a set of image files and group them based on a notion of distance in their stylistic representation alone. If operating over a set of image files known to interest a particular user, the disclosed system can generate a compact representation of the user's stylistic preferences. This representation is used to alter a standard set of search results, essentially boosting all images that are also stylistically similar to the user's past stylistic preferences. The ability to compare any pair of images in a style space also enables a novel way of grouping a set of images, e.g. search results, by style, irrespective of a user's preferences. This allows for a new user who has not yet expressed any style preferences to the system to quickly browse a set of search results grouped by style, where, for example, every row of results contains images in a particular style. It is also shown that the stylistic "cold-start problem" can be addressed by presenting a user with a series of image pairs and allowing the user to indicate which images the user stylistically prefers.

Although certain examples provided herein may describe a user's information (e.g., a user's interaction data with image files) being stored in memory, in certain aspects each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely a server). In many examples, the user information does not include and/or share the specific identification of the user (e.g., the user's name) unless otherwise specifically provided or directed by the user.

Example System Architecture

FIG. 1 illustrates an example architecture 100 for identifying data files responsive to a search query and weighted according to a stylistic preference. The architecture 100 includes servers 130 and clients 110 connected over a network 150.

One of the many servers 130 is configured to host a search engine, a collection of media files, a user profile database, and a convolutional neural network. For purposes of load balancing, multiple servers 130 can host the search engine, collection of media files, and the convolutional neural network. The servers 130 can be any device having an appropriate processor, memory, and communications capability for hosting the search engine, collection of media files, user profile database, and convolutional neural network. In certain aspects, one or more of the servers 110 can be a cloud computing server of an infrastructure-as-a-service (IaaS) and be able to support a platform-as-a-service (PaaS) and software-as-a-service (SaaS) services.

As discussed herein, the search engine is configured to receive a search query associated with a user identifier (e.g., from one of the clients 110 over the network 150), and search the collection of media files to identify image files that are responsive to the search query. The identification of the image files can be facilitated by use of an index of data vectors for the image files in the collection of media files that is generated using the convolutional neural network. In certain aspects, media files (and their corresponding data vectors) may be provided over the network 150 from other devices, such as devices owned by users that generate the media files for consumption.

The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local-area network (LAN), a campus area network (CAN), a metropolitan area network (MAN), a wide-area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The search engine is configured to assign a relevancy score to each identified image file. The relevancy score can be based on, for example, a distance of a data vector associated with an image file from a centroid of a cluster associated with a parameter of the received search query. The search engine is also configured to retrieve a stylistic preference profile associated with the user identifier from the user profile database. Alternatively, if the user identifier is associated with more than one stylistic preference profile, the search engine can retrieve several stylistic preference profiles associated with the user identifier (e.g., a particular stylistic preference profile associated with a user identifier can be received along with the search query). The search engine is configured to weight the relevancy score assigned to each identified image file according to the stylistic preference profile associated with the user identifier in order to generate a weighted stylistic preference score for each image file. The identified image files (as responsive to the user's search query) are then returned by the search engine on one of the servers 130 either ranked, categorized, and/or filtered by weighted stylistic preference score or stylistic preference profile back to the client 110 from which the search query was received.

Example User Stylistic Preference Profile Weighting System for Image Files

Figure 2:
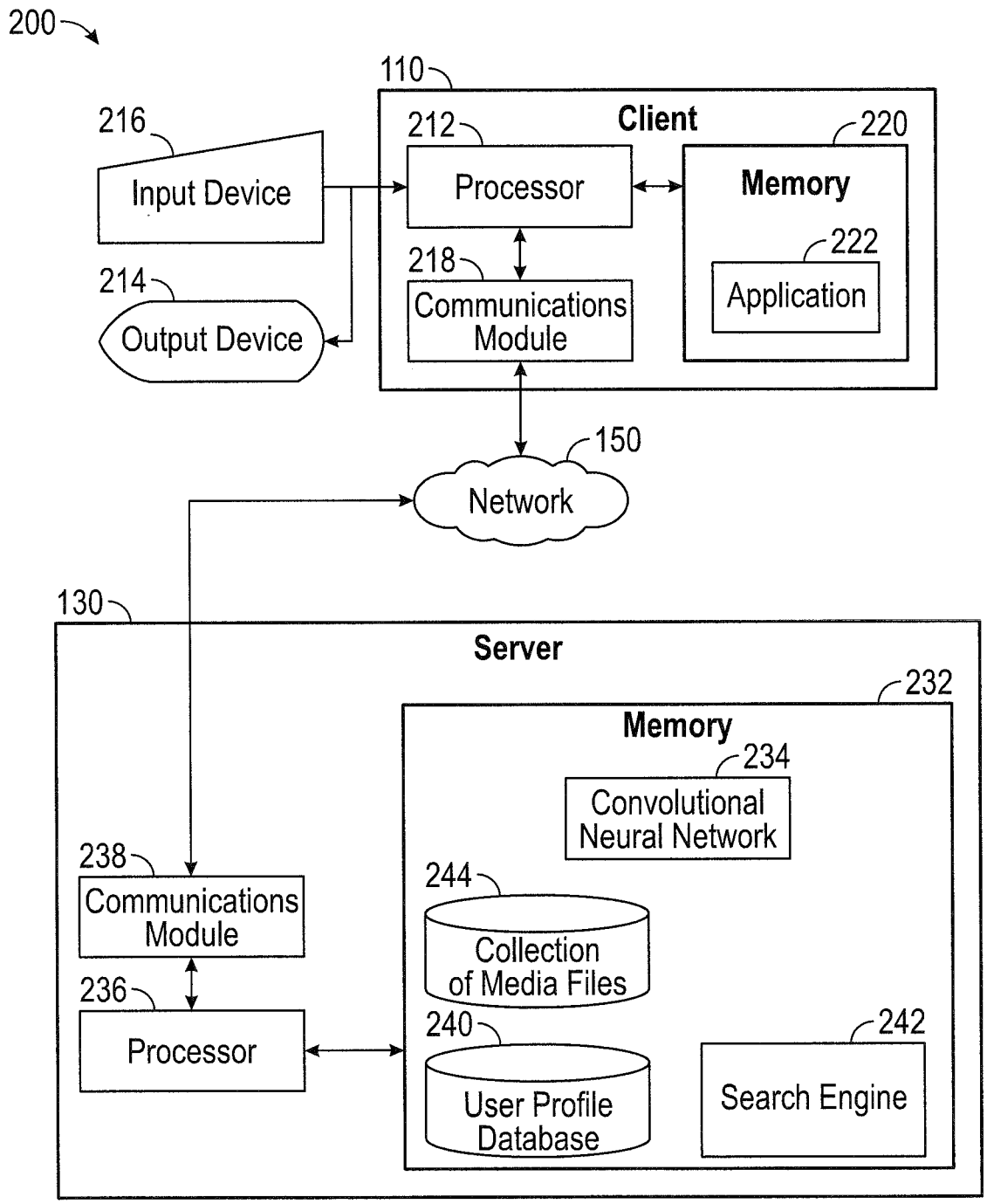
FIG. 2 is a block diagram illustrating the example client and server from the architecture of FIG. 1 according to certain aspects of the disclosure.

FIG. 2 is a block diagram illustrating an example server 130 and client 110 in the architecture 100 of FIG. 1 according to certain aspects of the disclosure.

The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218, 258, and 238 can be, for example, modems or Ethernet cards.

The server 130 includes a processor 236, a communications module 238, and a memory 232 that includes a search engine 242, a collection of media files 244, a convolutional neural network 234, and a user profile database 240.

The search engine 242 is configured to receive a search query (e.g., from an application 222 running in a memory 220 of the client 110 over the network 150), and search the collection of media files for media files that are responsive to the search query based on identifiers associated with the media files that match or otherwise have a sufficient degree of similarity to parameters (e.g., terms) of the search query. The search query can include search parameters (e.g., keywords) entered by the user of the client 110 using an input device 216 of the client 110 and processed by a processor 212 of the client 110 prior to being sent by the application 222 (e.g., a web browser) on the client 110 over the network 150 to the search engine 242 on the server 130.

The search engine 242, upon receipt of the search query from the client 110, may access an index of identifiers that is accessible for the collection of media files 244 in order to more quickly identify media files responsive to the search query. Once media files are identified as responsive to a received search query, the search engine is configured to return a listing (e.g., a copy of a web page) with identifiers (e.g., links to thumbnails) of the media files responsive to the received search query. In certain aspects, each of the media files responsive to the received search query, such as image files, are associated with a relevance score indicating a relevance of the respective image file to the search query.

The collection of media files 240 includes files such as images, video recordings with or without audio, visual multimedia (e.g., slideshows). In certain aspects the collection of media files 240 also includes a dense vector for each media file in the collection of media files 240, and each media file in the collection of media files 240 is mapped to its corresponding dense vector representation using a unique index value for the media file that is listed in an index. The dense vector representation of a media file (e.g., a 256 dimensional vector) captures the visual nature of the corresponding media file (e.g., of a corresponding image). The dense vector representation of a media file is such that, for example, given a pair of dense vector representations for a corresponding pair of images, similarity calculations, such as by using a cosine similarity algorithm, can meaningfully capture a stylistic similarity between the images. In certain aspects, each dense image vector can be normalized (e.g., to be the same scale) prior to later processing, e.g., prior to applying the cosine similarity algorithm to each dense image vector in order to expedite such later processing.

The convolutional neural network 234 can be a type of feed-forward artificial neural network where individual neurons are tiled in such a way that the individual neurons respond to overlapping regions in a visual field. The architecture of the convolutional neural network 234 may be in the style of existing well-known image classification architectures such as AlexNet, GoogLeNet, or Visual Geometry Group (VGG) models. In certain aspects, the convolutional neural network 234 consists of a stack of convolutional layers followed by several fully connected layers. The convolutional neural network 234 can include a loss layer (e.g., softmax or hinge loss layer) to back propagate errors so that the convolutional neural network 234 learns and adjusts its weights to better fit provided image data. The convolutional neural network 234 can be used to train a model to generate the dense vector representations for media files, such as for images, and map each media file to its corresponding dense vector representation in a dense vector space, wherein distance can be calculated between points associated with the dense vector representations in the dense vector space.

The user profile database 240 includes user identifiers and stylistic preference information for the user identifiers. For example, for a particular user identifier, the user profile database 240 can store one or several user stylistic preference profiles associated with that particular user identifier, past browsing behavior (e.g., user selections or downloads of particular image files) associated with that particular user identifier, responses to stylistic preference prompts associated with training images from the collection of media files 244, and predicted image files the user is likely to stylistically prefer based on past browsing behavior of the user. The user profile database 240 can further store, for example, an identification of image files from the collection of media files 244 with which the user has interacted or is likely to stylistically prefer, a cluster mapping of these identified images, described in further detail below, and weight values associated with the clusters, also described in further detail below.

Data vectors for each of the media files from the collection of media files 244 can be clustered by the processor 236 into a predetermined number of clusters according to a clustering algorithm, such as agglomerative clustering. As noted above, information on the clustering as described herein can be stored by the user profile database 240.

Agglomerative clustering may be performed using Ward or average linkage over a set of image files indicated as preferred by the user using the stylistic loss between each image file pair as the affinity measure. For example, the data vectors for the media files from the collection of the media files 244 can be assigned to clusters by the clustering algorithm based on a similarity threshold. The tree of clusters may be cut when K clusters remain, and the existing clusters can be treated as representing stylistically cohesive groups. In other words, the number of clusters can be manually selected (e.g., as a predetermined number of clusters), such as, for example, designating that the collection of the media files be divided into 1000 clusters.

Alternatively, the number of clusters can be decided using a threshold linkage score. The thresholded linkage score can be used as a stopping criteria for the agglomerative clustering algorithm. For instance, clusters may be combined until the average linkage value is more than a universal threshold determined to ensure clusters retain some minimal stylistic cohesiveness. In certain aspects, the universal threshold can be determined by manually examining a large number of user-defined threshold values and evaluating the results of clusterings for a large set of examples based on those user-defined threshold values to determine the largest value that stylistically maintains cohesive clusters. In certain aspects, the universal threshold can be determined by tuning the universal threshold value via A-B testing where different values are used for different segments of users and the value that produces the best user satisfaction is chosen, with metrics such as engagement or total downloaded images used as proxies of user satisfaction.

Data vectors for the media files from the collection 244 can also be designated to belong to one of the clusters based on a similarity threshold using a clustering algorithm. The similarity threshold can indicate stylistic similarity, visual similarity, conceptual similarity, keyword similarity, or another measurement of similarity between media files.

Other clustering algorithms can also be used, including other methods of vector quantization, or other clustering approaches such as affinity propagation clustering, agglomerative clustering, Birch clustering, density-based spatial clustering of applications with noise (DBSCAN), feature agglomeration, mini-batch k means clustering, mean shift clustering using a flat kernel, or spectral clustering. The clustering may occur prior to a user submitting a search query, but subsequent to the user indicating that user is available to submit the search query (e.g., after a web page including a search interface for the search engine 242 is requested from the server 130 by the application 222 on the client 110 of the user.

Subsequent to completion of clustering of the image files, a centroid is computed for each cluster. The centroid, which is used to represent the cluster, may be considered a stylistic average of the image files of the centroid. In certain aspects, the centroid for a cluster is computed as the image file in the cluster that has the lowest average distance to all other image files in the cluster.

In certain aspects, weighting the relevancy score for each image file (e.g., for which the user has indicated a preference such as based on past interaction) to generate the weighted stylistic preference score occurs in a process of first, for each image file in the set of image files, setting a style boost score as zero. Next, for each cluster, the process includes computing a distance between each image file in the set of image files (e.g., by calculating the stylistic loss between the two image files) and the stylistic centroid of the respective cluster.

The distance can be computed according to various approaches. For example, in certain aspects, the disclosed system builds on the stylistic loss function between a pair of image files that captures the degree to which two images differ stylistically, as disclosed by Gatys et al in "Style Transfer Using Convolutional Neural Networks," which builds upon the Visual Geometry Group (VGG) convolutional neural network 234 and its feature space defined in K. Simonyan et al's "Very Deep Convolutional Networks for Large-Scale Image Recognition" (2015), for which the feature space of the VGG network is built on top of "Texture Synthesis Using Convolutional Neural Networks" by Gatys et al (2015), each of which are incorporated by reference herein in its entirety for all purposes.

In the disclosed system, the processor 236 of the server 130 is configured to obtain a representation of a style of an input image using a feature space designed to capture texture information. In certain aspects, the feature space is built on top of filter responses in any layer of the VGG network. The feature space consists of correlations between different filter responses, where expectation is taken over a spatial extent of feature maps. These feature correlations are given by the Gram matrix $G^l \in R^{N_l \times N_l}$, where $G^l_{ij}$ is the inner product between the vectorized feature maps i and j in layer l:

$$G^l_{ij} = \sum_k F^l_{ik} F^l_{jk}. \qquad (1)$$

There are multiple Gram matrices, one at each layer of the convolutional neural network 234, which correspond to a multi-scale representation of the image designed to capture texture information representative of style but not content. In other words, each image file from the collection of media files 244 can be associated with a Gram matrix when processed by the convolutional neural network 234.

For example, for a given pair of image files from the collection of media files 244, the processor 236 is configured to compute the Gram matrices for each image file separately. For each layer in the convolutional neural network 234, the processor 236 is configured to then compute the contribution to a total loss function using equation (2) below, where $G^l_{ij}$ is the i,jth entry in the lth layer Gram matrix for the one of the image files and $A^l_{ij}$ is the corresponding entry for the Gram matrices A for the second image file:

$$E_l = \frac{1}{4N_l^2 M_l^2} \sum_{i,j} (G^l_{ij} - A^l_{ij})^2 \qquad (2)$$

Equation (3) represents a total loss across all layers in the network, where a weight factor indicates how important each layer is to the total loss:

$$\mathcal{L}_{style}(\vec{a}, \vec{x}) = \sum_{l=0}^{L} w_l E_l, \qquad (3)$$

The disclosed configuration allows for taking any pair of image files, pass each image through the convolutional neural network 234, obtain filter responses for each layer in the network, generate Gram matrices from these filter responses, and then calculate a loss function which indicates a distance in style space between any pair of image files.

After computing the distance in style space, the process for weighting the relevancy score for each image file to generate the weighted stylistic preference score includes updating the style boost score for a respective image file as a sum of the current style boost score for the image file and the user profile cluster weight value for the respective cluster, divided by a sum of a threshold value plus the computed distance between the respective image file and the stylistic centroid of the respective cluster.

The user profile cluster weight value for a cluster can be based on a normalization of the count of image files in each cluster by the total number of image files that have been clustered. For example, if there are 5, 10, and 15 image files in clusters 1, 2, and 3, respectively, then because there are a total of 30 image files, the user profile cluster weight value for clusters 1, 2, and 3 are 5/30, 10/30, and 15/30, or [0.17, 0.33, 0.5].

When no clusters remain, the weighted stylistic preference score is calculated for a respective image file as the updated style boost score for the respective image file multiplied by the relevancy score for the respective image file. The process then proceeds to iterate through each of the clusters for the next image file in the set of image files, until no image files remain in the set of image files to process.

In certain aspects, the user profile database 240 includes pre-processed stylistic preference information (e.g., processed before receiving a search query) for users. For example, in certain aspects, the processor 236 of the server 130 is configured to identify a subset of image files, from the collection of media files 244, with which a user (based on a user identifier associated with the user) has previously interacted. The subset of image files can include, for example, image files that are predicted to be preferred by the user based on past browsing behavior of the user, or the subset of image files can include a predetermined number of images previously downloaded by or selected by the user.

The subset of image files can also include image files previously presented to the user in subgroups with other image files, where the user has indicated their preference for the respective image file among the subgroups with the other image files. For example, if a user is presented with two image files and asked which image file the user prefers, and the user indicates a first of the two image files, then the first of the two image files is included in the subset of image files indicated as preferred by the user. In certain aspects, an image selection bias may be corrected for, for example, where a user might prefer an image of a person smiling over a person frowning regardless of a stylistic preference of the user.

The processor 236 is configured to cluster this subset of image files into a number of clusters based on their stylistic similarity. The stylistic similarity of each image file in the subset of image files is determined using an image vector corresponding to each image file. Each image file in the subset of image files is associated with a stylistic centroid of one of the clusters. The processor 236 is further configured to assign a user profile cluster weight value for the user to each cluster based on a normalized count of images in the cluster. The user profile cluster weight values and information regarding the clusters in the stylistic preference profile associated with the user identifier are stored in the user profile database 240.

The processor 236 of the server 130 is configured to execute instructions, such as instructions physically coded into the processor 236, instructions received from software in memory 240 (e.g., search engine 242), or a combination of both. For example, the processor 236 of the server 130 executes instructions to receive a search query for the collection of media files 244 from the client 110 that is associated with a user, the user being associated with a user identifier, and identify a set of image files from the collection of media files 244 that is responsive to the search query. Each image file in the set of image files is associated (e.g., by the processor 236 by instructions from the search engine 242) with a relevancy score indicating a relevance of the respective image file to the search query. The processor 236 is also configured to retrieve a stylistic preference profile associated with the user identifier (e.g., from the user profile database 240) to apply to the set of image files, and weight the relevancy score for each image file in the set of image files according to the stylistic preference profile associated with the user identifier to generate a weighted stylistic preference score for each image file as described above. The processor 236 is further configured to create a listing of the set of image files that is sorted according to the weighted stylistic preference score of each respective image file in the set of image files, and provide the listing to the client 110 (e.g., as a web page for display in the application 222) associated with the user for display (e.g., on an output device 214) of the client 110.

In certain aspects, when the listing is provided to the client 110 associated with the user for display, the provided listing of the set of image files is grouped according to the associated cluster to which the respective image file belongs. For example, a copy of web page with a user interface displaying the provided listing of the set of image files in response to the search query can be provided by the server 130 to the application 222 on the client 110 for display in the application 222. In certain aspects, the listing is filterable by the associated cluster to which the respective image file belongs. For example, if listings each associated with a different cluster representative of a stylistic preference of the user are displayed, then the user can select or de-select in the user interface a label associated with a respective stylistic preference in order to display or remove from display in the user interface the image files associated with the stylistic preference. In certain aspects, the label can be named or renamed by the user. For example, if the label is simply titled "Style 1," but the user views the stylistic preference associated with the style as representative of tilt-shift photography, then the label can be relabeled in the user interface by the user from "Style 1" to "Tilt-Shift."

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3A:
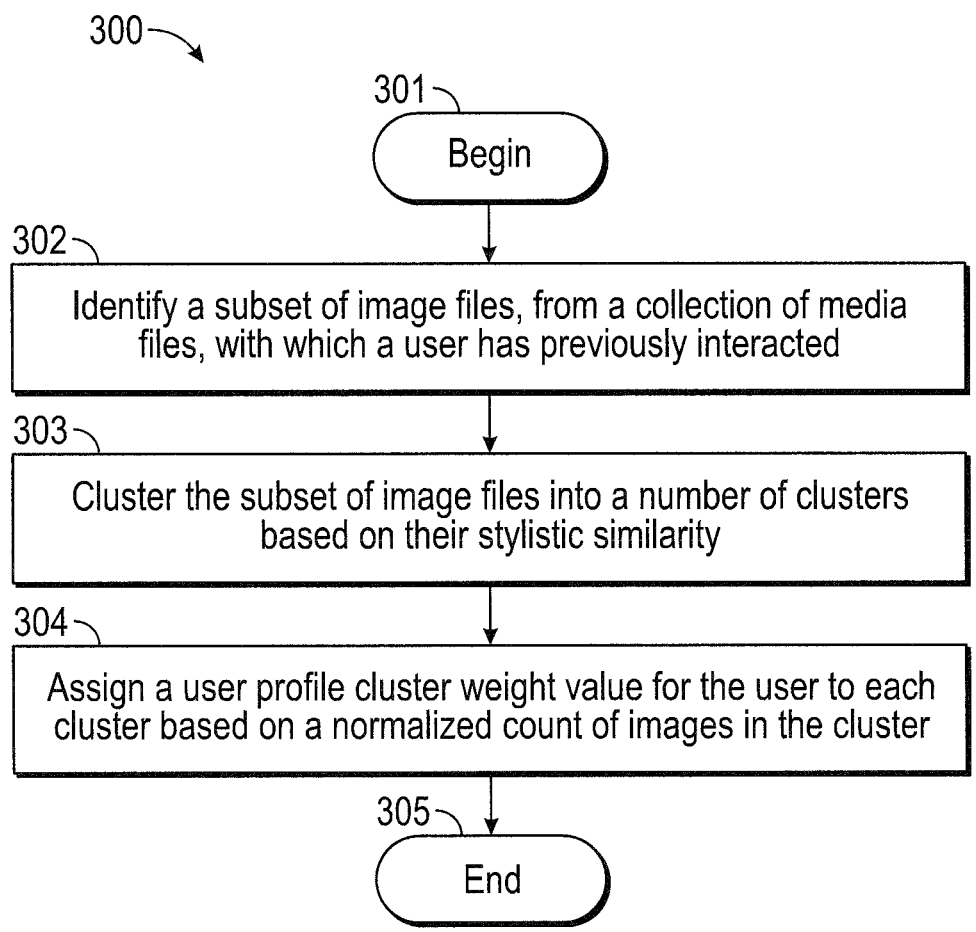
FIG. 3A illustrates an example process for pre-processing data files to weight them according to a user's stylistic preference using the example server of FIG. 2.

FIG. 3A illustrates an example process 300 for pre-processing data files to weight them according to a user's stylistic preference using the example client 110 of FIG. 2. While FIG. 3 is described with reference to FIG. 2, it should be noted that the process steps of FIG. 3 may be performed by other systems.

Figure 4A:
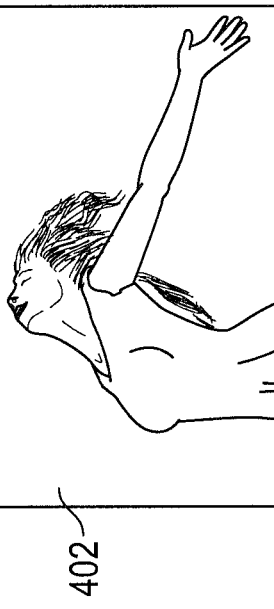
FIGS. 4A-4F are example illustrations associated with the example processes of FIGS. 3A and 3B.
Figure 4A:
Figure 4B:
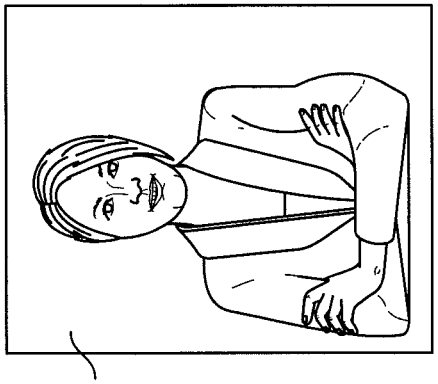
Figure 4B:
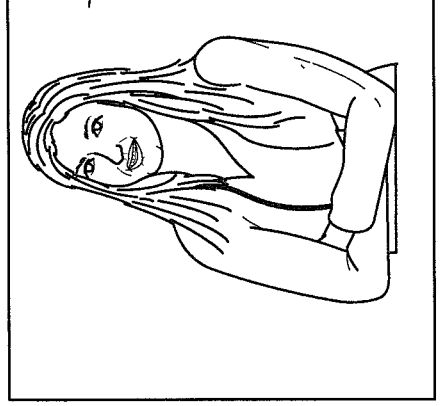

The process 300 begins by proceeding from beginning step 301 when a request for pre-processing of image files is received to step 302 a subset of image files, from the collection of media files 244, with which a user has previously interacted is identified. As noted above, each image file in the collection of media files 244 has an associated unique index value mapping each image file to a corresponding dense image vector for the image file capturing a visual nature of the image file. For example, with reference to the example illustration 400 of FIG. 4A, the user may previously have presented with a survey of image files, presented in pairs, prompting the user to identify a stylistic preference of the user for one image file 401 as compared to the other image file 402. The stylistic preference of the user can be indicated as a binary preference (i.e., the user prefers one image file over another image file without reference to a degree of preference), or as a degree of preference that can be indicated by a user on a scale 403. In the example illustration 400, the user indicates a stylistic preference for images of women with arms crossed. Surveying the user with such subgroups of image files can facilitate identifying a stylistic preference of the user where no previous stylistic preference data for the user exists in the user profile database 240. The stylistic preference of the user for a particular image file, and the degree of that preference, may then be stored for the user according to the user's identifier in the user profile database 240. An inference can then be made from the user's indicated stylistic preference as to other image files from the collection of media files 244 that the user would likely prefer stylistically. The user can then confirm 413 the inference by way of a second user interface presenting the other image files 411 and 412 from the collection of media files 244 as provided in the example illustration 410 of FIG. 4B.

Next, in step 303, the subset of image files is clustered into a number of clusters based on their stylistic similarity using one of the clustering approaches disclosed herein, wherein the stylistic similarity of each image file in the subset of image files is determined using an image vector corresponding to each image file, and wherein each image file in the subset of image files is associated with a stylistic centroid of one of the clusters. Finally, in step 304, a user profile cluster weight value for the user is assigned to each cluster based on a normalized count of images in the cluster, as described above. The process 300 ends in step 305.

Figure 3B:
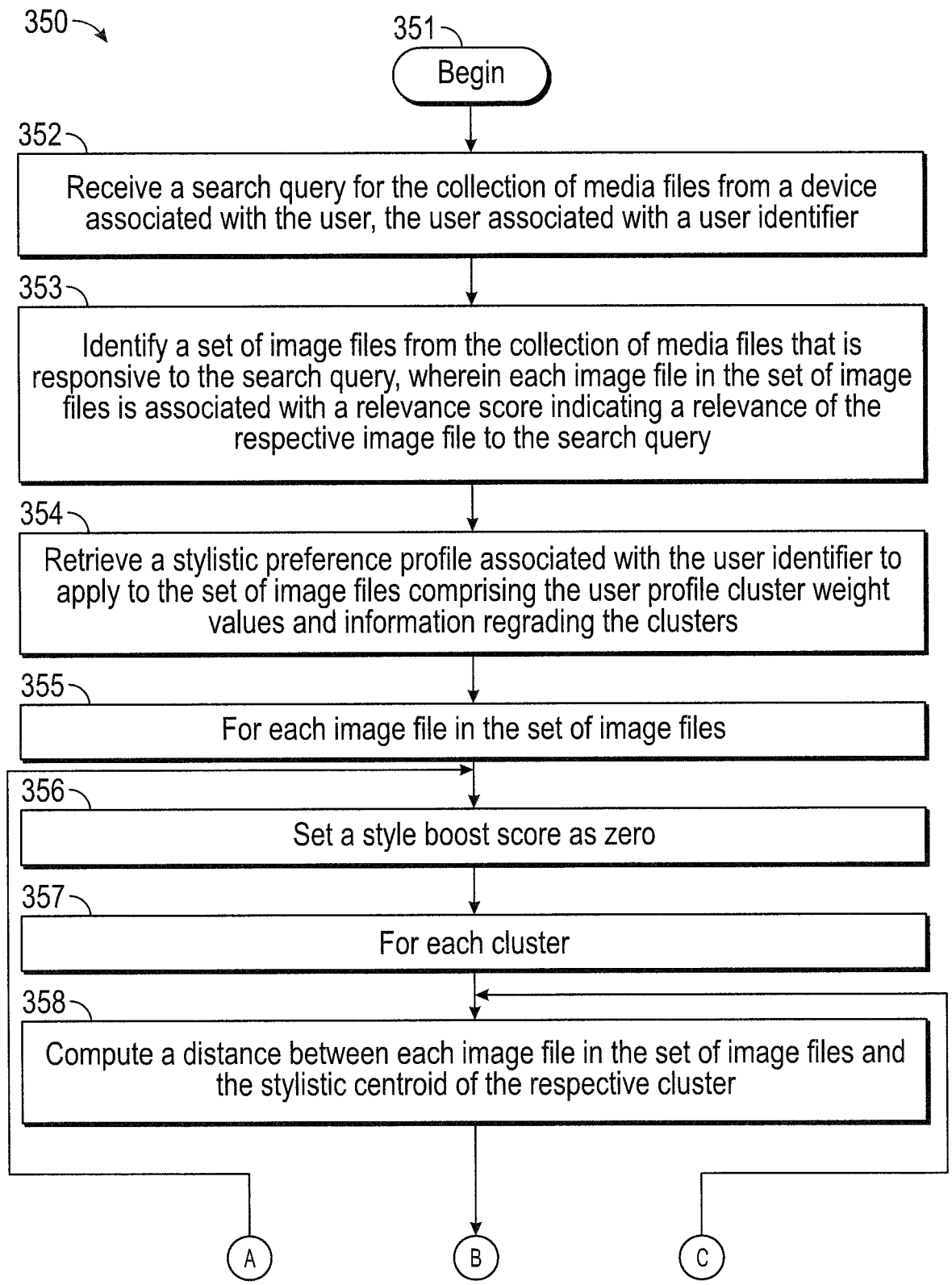
FIG. 3B illustrates an example process for identifying data files responsive to a search query and weighted according to a user's stylistic preference.
Figure 3B:
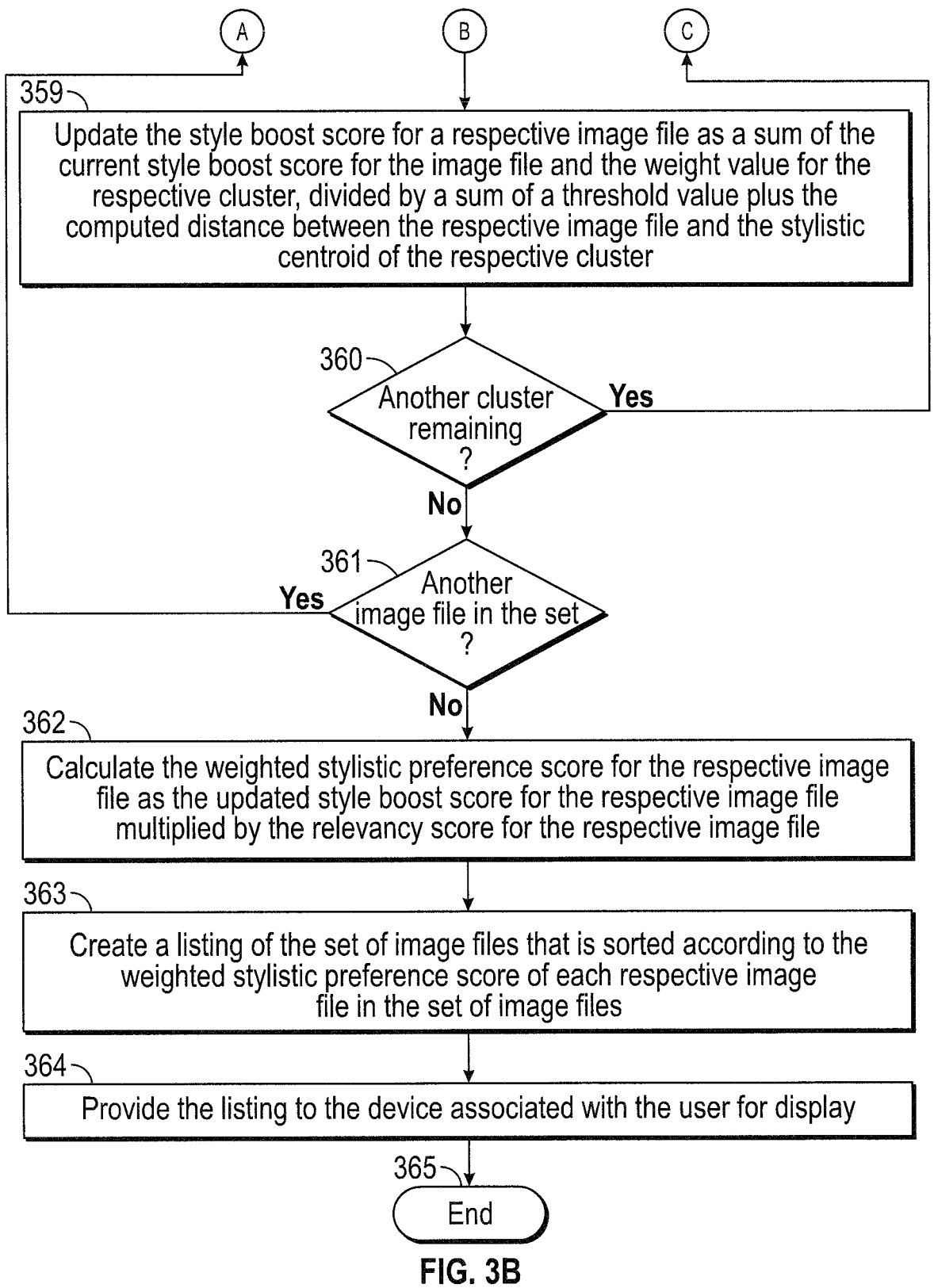
Figure 4C:
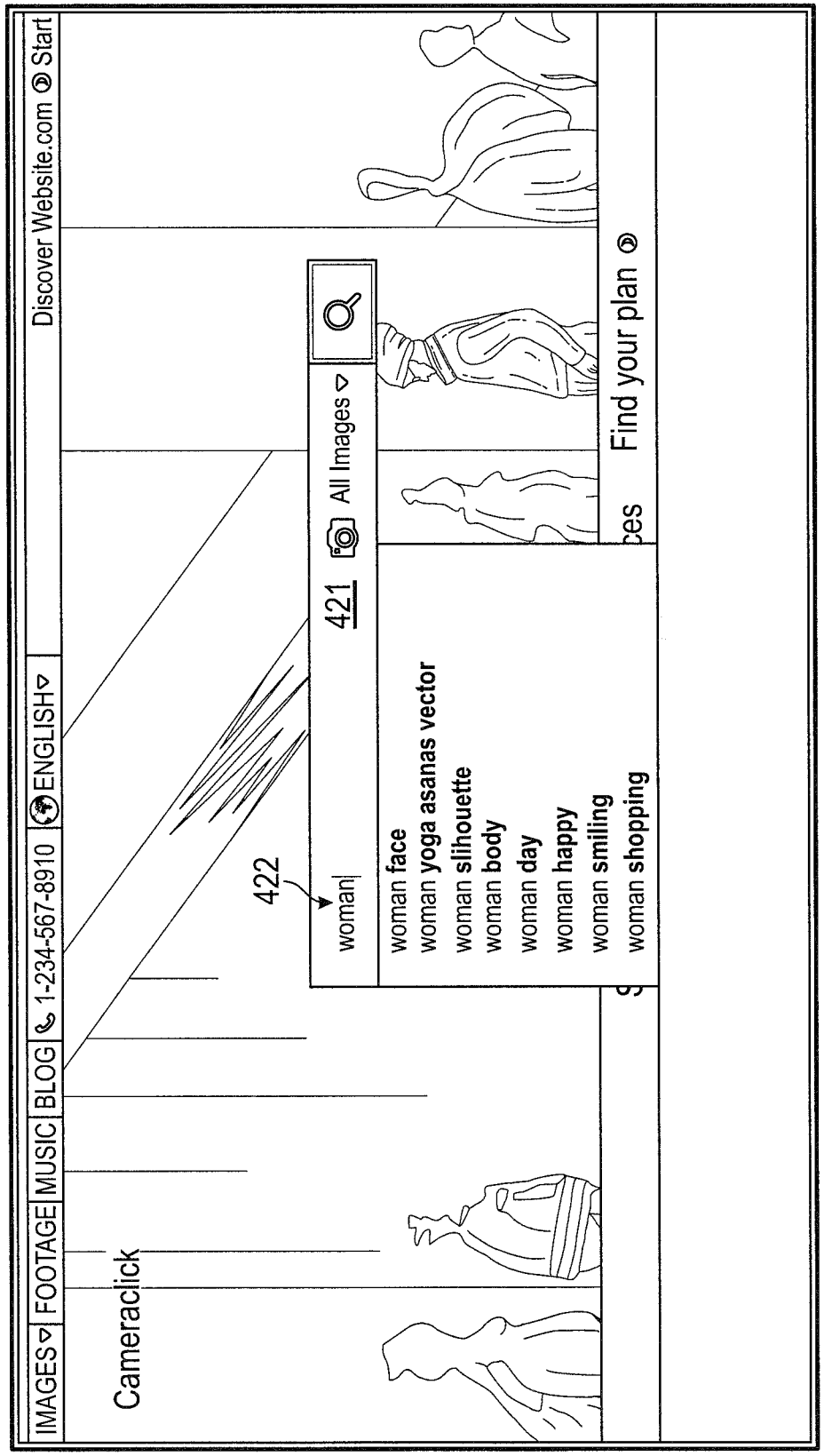

FIG. 3B illustrates an example process 350 for identifying data files responsive to a search query and weighted according to a user's stylistic preference. The process 350 begins by proceeding from beginning step 351, for example, when a user indicates an interest in submitting a search query for the collection of media files 244 to the search engine 242, such as by the application 222 on the client 110 of the user requesting a copy of a web page with an interface to submit a search query to the search engine 242 from the server, to step 352 when the search query for the collection of media files 244 is received from the client 110 associated with the user, where the user associated with a user identifier. In certain aspects, the user identifier may be provided by the application 222 along with the search query submitted by the user. FIG. 4C provides an example illustration 420 of a copy of the web page displayed by the application 222 (e.g., a web browser) on the client 110 with a user seeking to submit a search query of the term "woman" 422 in a search input field 421 for the search engine 421.

Figure 4D:
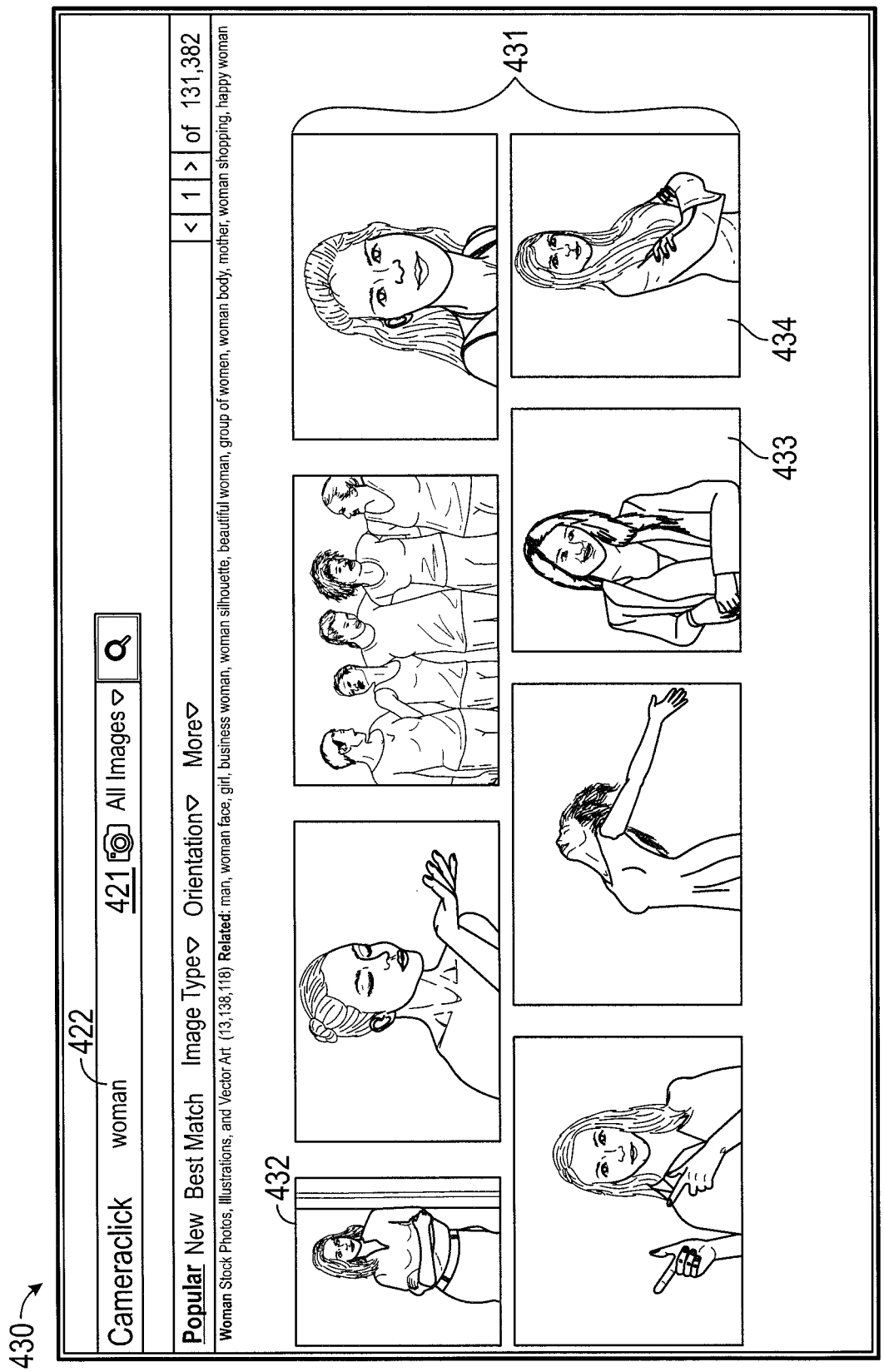

Next, in step 353, a set of image files from the collection of media files 244 is identified that is responsive to the search query. As noted above, each image file in the set of image files is associated with a relevance score (e.g., by the search engine 242) indicating a relevance of the respective image file to the search query. FIG. 4D provides an example illustration 430 of a set of image files as search results 431 responsive to the search query "woman" 422 (in the input field 421) and ranked by relevance score that would be displayed in the application 222 prior to analysis of the user's stylistic preference. Included in the set of image files are three images 432, 433, and 434 of women with their arms crossed.

In step 354 a stylistic preference profile associated with the user identifier (associated with the client 110 or received with the search query) is retrieved (e.g., from the user profile database 240) to apply to the set of image files (identified as responsive to the search query). The stylistic preference profile includes the user profile cluster weight values for the image files in the set, and information regarding the clusters with which the image files in the set are associated.

Subsequently, in beginning loop step 355, a loop begins for each image file in the set of image files, in which at first in step 356 a style boost score is set as zero for the current image file from the set for which the loop is being performed.

Next, in subloop beginning step 357, a subloop begins for each cluster among all of the clusters, in which at first in step 358 a distance is computed between each image file in the set of image files and the stylistic centroid of the respective cluster for which the subloop is being performed. Next, in subloop step 359, the style boost score for the respective image file of the loop is updated as a sum of the current style boost score for the image file of the loop and the weight value for the respective cluster of the subloop, divided by a sum of a threshold value plus the computed distance between the respective image file of the loop and the stylistic centroid of the respective cluster of the subloop.

If another cluster remains at end subloop step 360, the process 350 returns to beginning subloop step 357, otherwise the process 350 proceeds to end loop step 361.

If another image file remains in the set of image files at end loop step 361, the process 350 returns to beginning loop step 355, otherwise the process 350 proceeds to step 362.

Figure 4E:
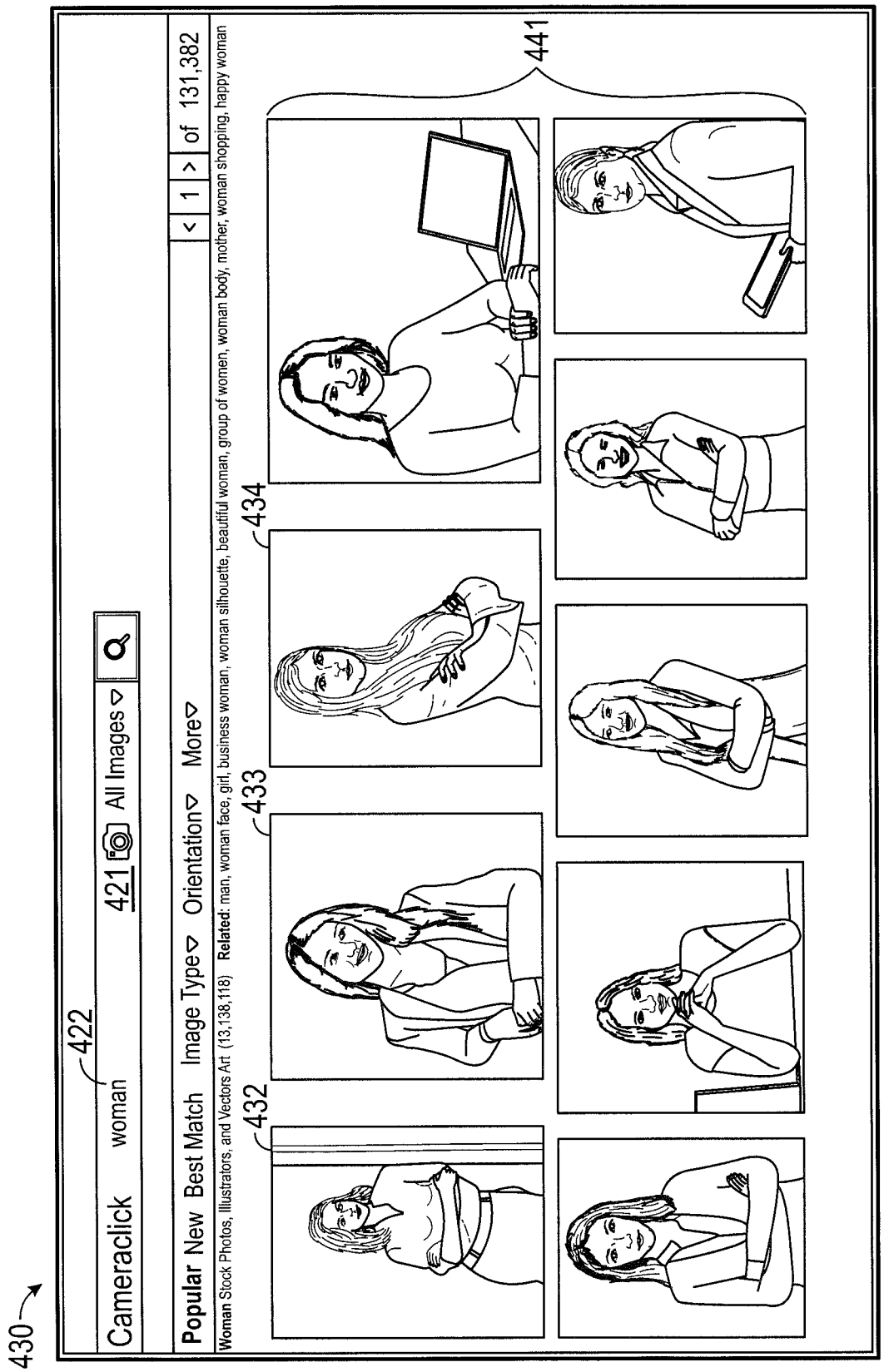

In step 362, the weighted stylistic preference score for the respective image file is calculated as the updated style boost score for the respective image file multiplied by the relevancy score for the respective image file. In step 363, a listing of the set of image files is created that is sorted according to the weighted stylistic preference score of each respective image file in the set of image files. In step 364 the listing is provided (e.g., over the network 150) as search results 441 for the search query 422 (e.g., in the search input field 421) to the client 110 associated with the user for display (e.g., through the output device 214 via the application 222), as provided in the example illustration 440 of FIG. 4E. In the example illustration 440, the three images that would have been provided as search results 432, 433, and 434 without reference to a stylistic preference of the user (as illustrated in FIG. 4D) now appear earlier in the sort, and the search results 441 include many more images of women with their arms crossed, which is indicative of the stylistic preference of the user submitting the search as noted earlier for the user with reference to FIG. 4A.

Figure 4F:
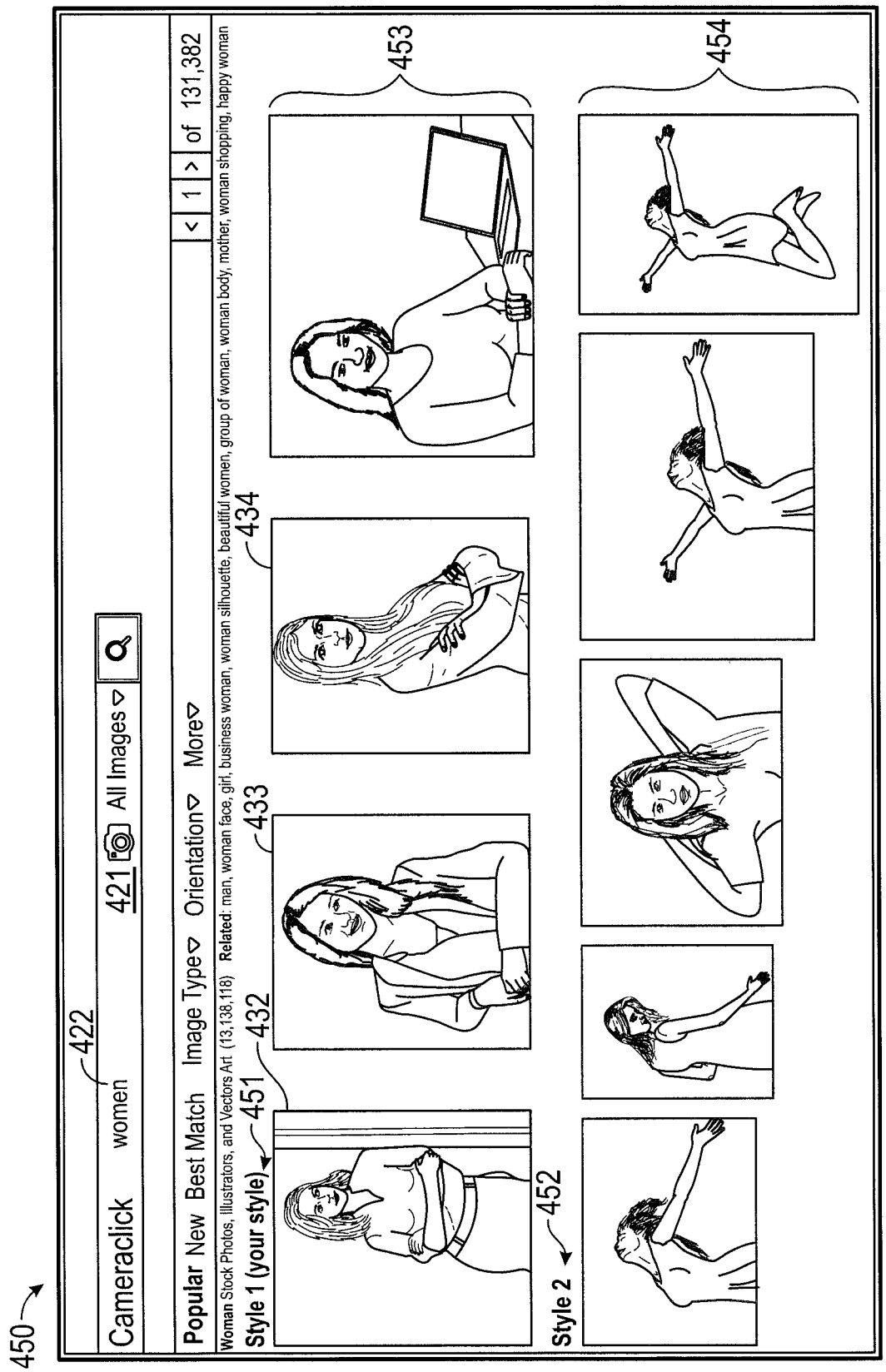

Additionally, in certain aspects and as provided in the example illustration 450 of FIG. 4F, search results for the "woman" search query 422 in the input field 421 can be grouped according to stylistic preference, with a first group of image files 453 grouped according to a first stylistic preference of the user, "Style 1" 451 (e.g., with images of women with their arms crossed), and a second group of image files 454 grouped according to a second stylistic preference of the user, "Style 2" 452 (e.g., with images of women with a bright light source and in nature). For each group of image files 453 and 454, the image files that are displayed may be sorted according to the highest weighted stylistic preference score for the style of the group (e.g., image files sorted by lowest distance to the centroid for the style). The process 350 ends in step 365.

Hardware Overview

Figure 5:
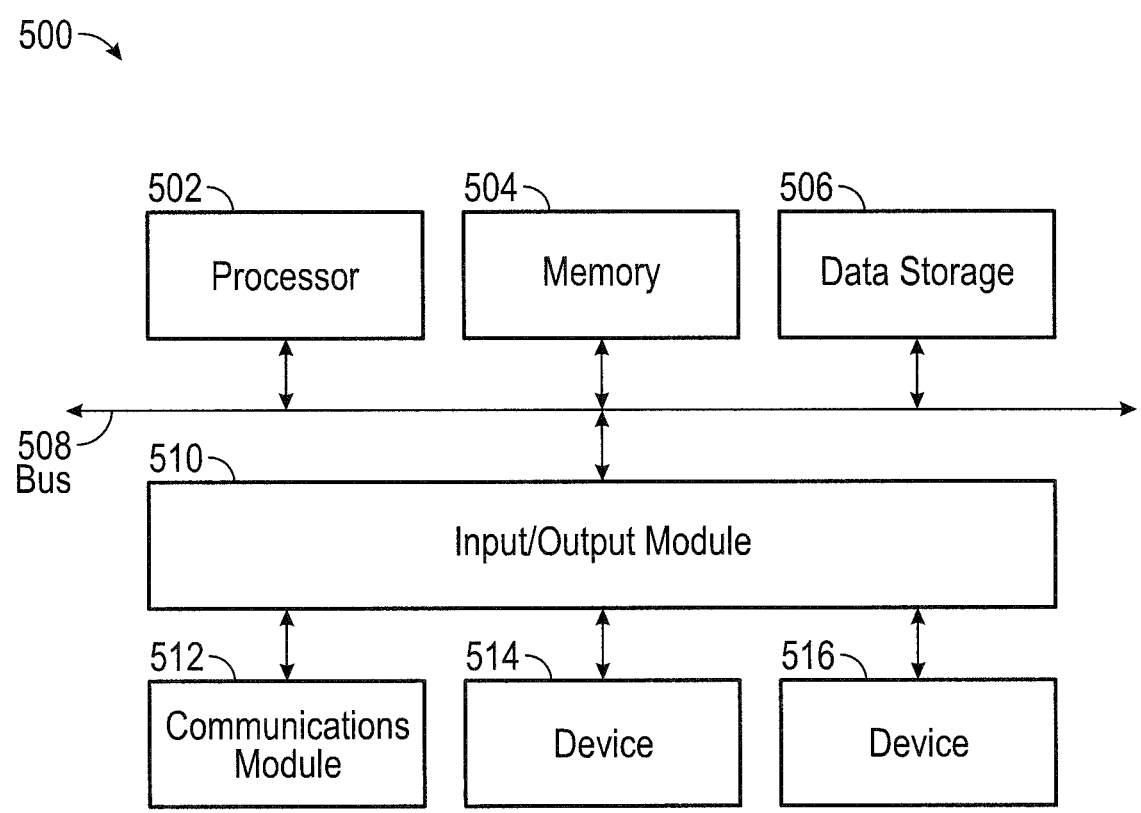
FIG. 5 is a block diagram illustrating an example computer system with which the client and server of FIG. 2 can be implemented.

FIG. 5 is a block diagram illustrating an example computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 500 may be implemented with one or more processors 502.

Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 234), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special-purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., communications module 218 and 238) include networking interface cards, such as Ethernet cards and modems.

The components of the system can be interconnected by any form or medium of digital data communication, e.g., a communication network. The communication network (e.g., network 150) can include, for example, any one or more of a PAN, a LAN, a CAN, a MAN, a WAN, a BBN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link and communications module 512. In the Internet example, a server might transmit a requested code for an application program through Internet, the ISP, the local network and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for identifying data files responsive to a search query and weighted according to a visual stylistic preference, the method comprising:
   identifying a subset of image files, from a collection of media files, with which a user has previously interacted;
   clustering the subset of image files into a number of clusters based on their stylistic similarity, wherein a stylistic similarity of each image file in the subset of image files is determined using an image vector corresponding to each image file, wherein each image file in the collection of media files has an associated unique index value mapping each image file to a corresponding dense image vector for the image file and capturing a visual nature of the image file, and wherein each image file in the subset of image files is associated with a stylistic centroid of one of the clusters, the stylistic centroid for a cluster being a stylistic average of the image files in its respective cluster;
   assigning a user profile cluster weight value for the user to each cluster based on a count of images in the cluster normalized by a total number of image files that have been clustered;
   storing the user profile cluster weight values and information regarding the clusters in a visual technique preference profile associated with a user identifier associated with the user;
   receiving the search query for the collection of media files from a device associated with the user;
   identifying a set of image files from the collection of media files that is responsive to the search query, wherein each image file in the set of image files is associated with a relevancy score indicating a relevance of a respective image file in the set of image files to the search query;
   retrieving the visual technique preference profile associated with the user identifier to apply to the set of image files;
   weighting the relevancy score for each image file in the set of image files according to the visual technique preference profile associated with the user identifier to generate a weighted stylistic preference score for each image file in the set of image files;
   creating a listing of the set of image files that is sorted according to the weighted stylistic preference score for each respective image file in the set of image files; and
   providing the listing to the device associated with the user for display in a user interface,
   wherein images files in the set of image files are separately displayed in a group indicated by a label in the user interface that is selectable and namable by the user, and according to an associated cluster to which the respective image file belongs, and
   wherein the listing is filterable by the associated cluster to which the respective image file belongs.

2. The computer-implemented method of claim 1, wherein each image file is also associated with a gram matrix.

3. The computer-implemented method of claim 1, wherein the clustering comprises agglomerative clustering.

4. The computer-implemented method of claim 1, wherein identifying the subset of image files from the collection of media files with which the user has previously interacted comprises predicting the subset of image files based on past browsing behavior of the user, or selecting a predetermined number of images previously downloaded by or selected by the user.

5. The computer-implemented method of claim 1, wherein the subset of image files from the collection of media files comprises image files previously presented to the user among multiple subgroups including other image files, the user indicating their preference for the respective image file among the subset of image files when presented among the subgroups including other image files.

6. The computer-implemented method of claim 1, wherein the clustering occurs prior to the user submitting the search query and subsequent to receiving an indication that the user is available to submit the search query.

7. The computer-implemented method of claim 1, wherein the number of clusters is either a predetermined number, or decided using a threshold linkage score.

8. The computer-implemented method of claim 1, wherein weighting the relevancy score for each image file to generate the weighted stylistic preference score comprises:
   for each image file in the set of image files, setting, to zero, a style boost score; and
   for each cluster:
      computing a distance between each image file in the set of image files and the stylistic centroid of the respective cluster;
      updating the style boost score for the respective image file as a sum of a current style boost score for the image file and the user profile cluster weight value for the respective cluster, and divided by a sum of a threshold value plus a computed distance between the respective image file and the stylistic centroid of the respective cluster; and
      calculating the weighted stylistic preference score for the respective image file as the style boost score for the respective image file multiplied by the relevancy score for the respective image file.

9. A system for identifying data files responsive to a search query and weighted according to a visual stylistic preference, the system comprising:
   a memory comprising instructions; and
   a processor configured to execute the instructions which, when executed, cause the processor to:
      identify a subset of image files, from a collection of media files, with which a user has previously interacted;
      cluster the subset of image files into a number of clusters based on their stylistic similarity, wherein a stylistic similarity of each image file in the subset of image files is determined using an image vector corresponding to each image file, wherein each image file in the collection of media files has an associated unique index value mapping each image file to a corresponding dense image vector for the image file capturing a visual nature of the image file, and wherein each image file in the subset of image files is associated with a stylistic centroid of one of the number of clusters, the stylistic centroid for a cluster being a stylistic average of the image files in its respective cluster;

assign a user profile cluster weight value for the user to each cluster based on a count of images in the cluster normalized by a total number of image files that have been clustered;

store the user profile cluster weight values and information regarding the clusters in a visual technique preference profile associated with a user identifier associated with the user;

receive the search query for the collection of media files from a device associated with the user;

identify a set of image files from the collection of media files that is responsive to the search query, wherein each image file in the set of image files is associated with a relevancy score indicating a relevance of a respective image file to the search query;

retrieve a visual technique preference profile associated with the user identifier to apply to the set of image files comprising the user profile cluster weight values and information regarding the clusters;

weight the relevancy score for each image file in the set of image files according to the visual technique preference profile associated with the user identifier to generate a weighted stylistic preference score for each image file in the set of image files;

create a listing of the set of image files that is sorted according to the weighted stylistic preference score for each respective image file in the set of image files; and provide the listing to the device associated with the user for display in a user interface, wherein images files in the set of image files are separately displayed in a group indicated by a label in the user interface that is selectable and nameable by the user, and according to an associated cluster to which the respective image file belongs, and wherein the listing is filterable by the associated cluster to which the respective image file belongs.

10. The system of claim 9, wherein each image file is also associated with a gram matrix, and wherein the clustering comprises agglomerative clustering performed prior to the user submitting the search query and subsequent to receiving an indication that the user is available to submit the search query.

11. The system of claim 9, wherein identifying the subset of image files from the collection of media files with which the user has previously interacted comprises: predicting the subset of image files based on past browsing behavior of the user; selecting a predetermined number of images previously downloaded by or selected by the user; or identifying image files previously presented to the user among multiple subgroups including other image files, the user indicating their preference for the respective image file among the subset of image files when presented among the subgroups including other image files.

12. The system of claim 9, wherein the number of clusters is either a predetermined number, or decided using a threshold linkage score.

13. The system of claim 9, wherein the processor being configured to weight the relevancy score for each image file to generate the weighted stylistic preference score comprises:

for each image file in the set of image files, set, to zero, a style boost score; and for each cluster:
compute a distance between each image file in the set of image files and the stylistic centroid of the respective cluster;
update the style boost score for a respective image file as a sum of a current style boost score for the image file and the user profile cluster weight value for the respective cluster, divided by a sum of a threshold value plus a computed distance between the respective image file and the stylistic centroid of the respective cluster; and
calculate the weighted stylistic preference score for the respective image file as the style boost score for the respective image file multiplied by the relevancy score for the respective image file.

14. A computer-implemented method for identifying data files responsive to a search query and weighted according to a visual stylistic preference, the method comprising:

providing the search query for a collection of media files from a device associated with a user to a server, the user being associated with a user identifier; and receiving, from the server and for display in a user interface on the device, a listing of multiple image files that is responsive to the search query and that is sorted according to a weighted stylistic preference score of each respective image file in image files generated based on a visual technique preference profile associated with the user identifier, wherein the listing of multiple image files is separately displayed in a group indicated by a label in the user interface that is selectable and nameable by a user and according to a stylistic similarity cluster to which the respective image file belongs, wherein the listing of multiple image files is filterable by the stylistic similarity cluster to which the image file belongs, wherein the image files are clustered into a number of clusters based on their stylistic similarity, each cluster having a user profile cluster weight value for the user that is based on a count of images in the cluster normalized by a total number of image files that have been clustered, wherein a stylistic similarity of each image file in a subset of image files is determined using an image vector corresponding to each image file, wherein each image file in the collection of media files has an associated unique index value mapping each image file to a corresponding dense image vector for the image file capturing a visual nature of the image file, and wherein each image file in the subset of image files is associated with a stylistic centroid of one of the clusters, the stylistic centroid for a cluster being a stylistic average of the image files in its respective cluster.

* * * * *